US011752856B2

(12) United States Patent
Ito et al.

(10) Patent No.: US 11,752,856 B2
(45) Date of Patent: Sep. 12, 2023

(54) DRIVING APPARATUS

(71) Applicants: c/o TOYOTA JIDOSHA KABUSHIKI KAISHA, Toyota (JP); c/o AISIN CORPORATION, Kariya (JP)

(72) Inventors: Sho Ito, Toyota (JP); Seitaro Nobuyasu, Toyota (JP); Hiroyuki Tateno, Toyota (JP); Yuki Yamada, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 15 days.

(21) Appl. No.: 17/652,351

(22) Filed: Feb. 24, 2022

(65) Prior Publication Data
US 2022/0266677 A1 Aug. 25, 2022

(30) Foreign Application Priority Data

Feb. 24, 2021 (JP) .................................. 2021-027028

(51) Int. Cl.
*B60K 7/00* (2006.01)
*B60K 17/04* (2006.01)

(52) U.S. Cl.
CPC .......... *B60K 7/0007* (2013.01); *B60K 17/046* (2013.01); *B60K 2007/0038* (2013.01)

(58) Field of Classification Search
CPC .................... B60K 17/046; B60K 7/0007
See application file for complete search history.

(56) References Cited

U.S. PATENT DOCUMENTS

| | | | | |
|---|---|---|---|---|
| 2012/0292978 A1* | 11/2012 | Buschjohann | ....... | B60G 21/051 264/328.1 |
| 2018/0345786 A1* | 12/2018 | Kucharski | ............ | B60K 17/165 |
| 2020/0266687 A1* | 8/2020 | Nakamatsu | .............. | H02K 5/20 |
| 2020/0328652 A1* | 10/2020 | Miki | ....................... | H02K 5/203 |
| 2020/0403482 A1* | 12/2020 | Luo | ......................... | H02K 7/116 |
| 2021/0008969 A1* | 1/2021 | Chopra | ................... | F16H 3/093 |
| 2022/0072951 A1* | 3/2022 | Auer | .................... | B60K 17/046 |
| 2023/0039195 A1* | 2/2023 | Nakamatsu | ............ | H02K 7/116 |

(Continued)

FOREIGN PATENT DOCUMENTS

| | | |
|---|---|---|
| JP | 2019070397 A | 5/2019 |
| JP | 2020174481 A | 10/2020 |

*Primary Examiner* — Erez Gurari
(74) *Attorney, Agent, or Firm* — Hunton Andrews Kurth LLP

(57) ABSTRACT

A driving apparatus of the present disclosure includes an electric motor including a stator and a rotor, a case accommodating the electric motor and mounted on a vehicle so as to partially overlap a side member as viewed from a vehicle width direction, a drive shaft connected to a wheel, a plurality of radial ribs respectively projecting in the vehicle width direction and extending radially, and a connecting rib projecting in the vehicle width direction and joining with center side ends of the plurality of radial ribs. At least part of the plurality of radial ribs reach a first region of the case that overlaps the side member and does not overlap with the wheel as viewed from the vehicle width direction. The driving apparatus improves strength of the case that accommodates the electric motor and is mounted on the vehicle.

8 Claims, 3 Drawing Sheets

(56) References Cited

U.S. PATENT DOCUMENTS

| | | | |
|---|---|---|---|
| 2023/0100892 A1* | 3/2023 | Ogasawara | H02K 5/06 310/164 |
| 2023/0114407 A1* | 4/2023 | Liu | F16H 57/042 184/6.12 |

* cited by examiner

DRIVING APPARATUS

CROSS-REFERENCE TO RELATED APPLICATION

The present disclosure claims priority to Japanese Patent Application No. 2021-27028 filed on Feb. 24, 2021, which is incorporated herein by reference in its entirety including specification, drawings and claims.

TECHNICAL FIELD

The present disclosure relates to a driving apparatus that includes an electric motor and a case accommodating the electric motor and is mounted on a vehicle.

BACKGROUND

A conventionally known driving apparatus includes a motor and is mounted as a power source on a hybrid electric vehicle, a battery electric vehicle and the like (as described in, for example, Patent Literature 1). In the driving apparatus, the motor is accommodated in a case (housing) together with a reduction device that reduces a rotation of the motor and a differential device that transmits a torque from the motor side to an axle (drive shaft). The driving apparatus is mounted on the vehicle so that an axle centers of the motor shaft and the differential device (differential shaft) extend in the left-right direction (width direction) of the vehicle.

CITATION LIST

Patent Literature

PTL1: Japanese Patent Application Laid Open No. 2020-174481

SUMMARY

When the vehicle with the above described driving apparatus is subjected to a collision (front or side collision), a side member of the vehicle may deform and directly interfere with the case (housing) of the driving apparatus, or another structure such as a pole may directly interfere with the case of the driving apparatus from a side of the vehicle. Accordingly, it is required to further improve strength of the case accommodating the motor, which is a high-voltage component, to withstand the impact when the collision occurs in the above described driving apparatus.

A main object of the present disclosure is to improve strength of the case of a driving apparatus that accommodates an electric motor and is mounted on a vehicle.

A driving apparatus of the present disclosure includes an electric motor including a stator and a rotor, a case accommodating the electric motor, and a drive shaft connected to a wheel. The case is to be mounted on a vehicle so as to partially overlap a side member as viewed from a vehicle width direction. The driving apparatus further includes: a plurality of radial ribs respectively projecting in the vehicle width direction and extending radially, and a connecting rib projecting in the vehicle width direction and joining with center side ends of the plurality of radial ribs. At least part of the plurality of radial ribs reach a first region of the case that overlaps the side member and does not overlap with the wheel as viewed from the vehicle width direction.

In the driving apparatus of the present disclosure, the case accommodating the electric motor includes the radial ribs respectively projecting in the vehicle width direction and extending radially, and the connecting rib projecting in the vehicle width direction and joining with the center side ends of the radial ribs. Further, at least part of the plurality of radial ribs reach a first region of the case that overlaps the side member and does not overlap with the wheel in the vehicle width direction. When the vehicle including the driving apparatus is subjected to a collision, such as a front collision or a side collision, the side member hits the portion included in the first region of the radial ribs connected to the connecting rib. Thus, when the side member collides with the first region of the case, stress applied from the side member to the radial ribs can be released to the connecting ribs having high strength, and the stress in the first region can be reduced so as to suppress the occurrence of damage in the first region. As a result, the strength of the case of the driving apparatus, which includes the electric motor and is mounted on the vehicle, can be improved.

DESCRIPTION OF EMBODIMENTS

The following describes some embodiments of the disclosure with reference to drawings.

Figure 1:
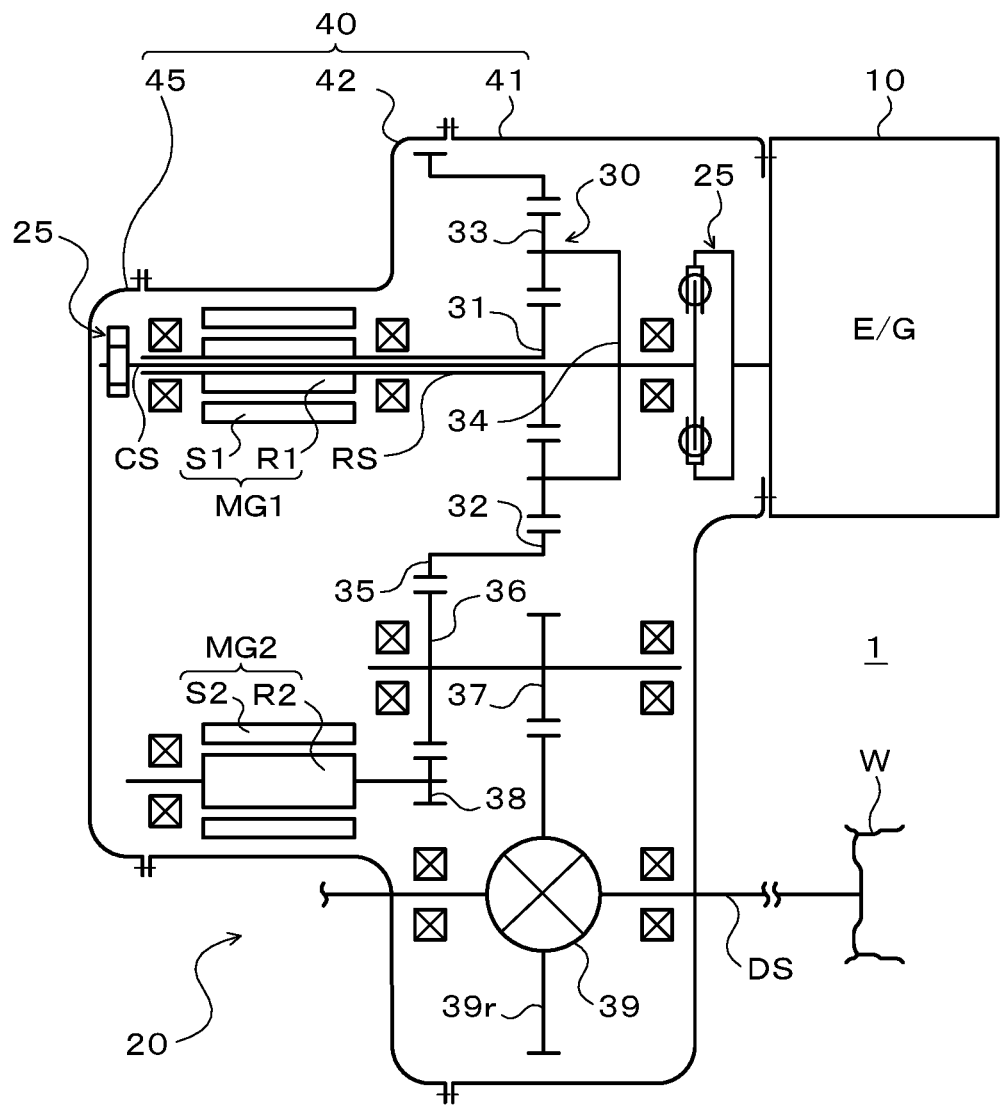
FIG. 1 is a schematic configuration diagram illustrating the vehicle including the driving apparatus according to the present disclosure.

FIG. 1 is a schematic configuration diagram illustrating a vehicle 1 including a transaxle 20 as a driving apparatus of the present disclosure. The vehicle 1 shown in the figure is a hybrid electric vehicle including an engine (internal combustion engine) 10, the transaxle 20 as the driving apparatus including motor generators MG1 and MG2 and connected to the engine 10, and a battery (power storage device) not shown in the figure that exchanges electric power with the motor generators MG1 and MG2 of the transaxle 20 via an inverter (not shown) and the like.

Engine 10 is a gasoline engine that burns a mixture of gasoline (hydrocarbon fuel) injected from injectors (not shown) and air in a plurality of combustion chambers, and converts reciprocating motion of pistons associated with the combustion of the mixture into rotational motion of a crankshaft. The engine 10 may be a diesel engine or a LPG engine.

As shown in FIG. 1, the transaxle 20 includes the motor generators MG1 and MG2 as well as a planetary gear 30 and a case 40 that accommodates these elements. The motor generator MG1 (first electric motor) is a synchronous generator motor (three-phase AC electric motor) including a stator S1 and a rotor R1, and mainly operates as a generator to convert at least a part of the power from the engine 10 under load operation into electric power. The motor generator MG2 (second electric motor) is a synchronous generator motor (three-phase AC electric motor) including stator S2 and rotor R2, and mainly operates as an electric motor that is driven by at least one of power from the battery and power from the motor generator MG1 so as to generate driving torque. The motor-generator MG1 and MG2 exchange electric power with the above battery via a power control unit not shown in the figure, and also exchange electric power with each other via the power control device.

The planetary gear 30 is a differential rotating mechanism that includes a sun gear (first rotating element) 31, a ring gear (second rotating element) 32, and a planetary carrier (third rotating element) 34 that rotatably supports a plurality of pinion gears 33. As shown in FIG. 1, the sun gear 31 is connected to the rotor R1 of the motor generator MG1 via the hollow rotor shaft RS. The planetary carrier 34 is connected to the crankshaft of the engine 10 via the damper mechanism 25. The ring gear 32 is integrated with a counter drive gear 35 as the output member, and both rotate coaxially and integrally.

The counter drive gear 35 is connected to the wheels W that configures the left and right drive wheels together with tires (not shown) via a counter driven gear 36 that meshes with the counter drive gear 35, a final drive gear (drive pinion gear) 37 that rotates integrally with the counter driven gear 36, a final driven gear (differential ring gear) 39r that meshes with the final drive gear 37, a differential gear 39, and drive shafts DS. The transaxle 20, that is, the planetary gear 30, the gear train from the counter drive gear 35 to the final driven gear 39r, and the differential gear 39 connect the engine 10 and the motor generator MG1 to each other, and also transmit a part of the output torque of the engine 10 as a power source to the drive shaft DS and the wheels W.

The drive gear 38 is connected (fixed) to the rotor R2 of the motor generator MG2 so as to rotate integrally with the rotor R2. The drive gear 38 has a smaller number of teeth than the counter driven gear 36 and meshes with the counter driven gear 36. Thus, the motor generator MG2 is connected to the left and right drive shafts DS and wheels W via the drive gear 38, counter driven gear 36, final drive gear 37, final driven gear 39r, and differential gear 39. In other words, the motor-generator MG2 functions as a power source that outputs driving torque (driving force) to the drive shafts DS and wheels W alone or in cooperation with the engine 10, and also outputs regenerative braking torque when braking the vehicle 1.

The case 40 of the transaxle 20 includes a first case 41, a second case 42 and a cover (third case) 45. The first case 41 is fastened (connected) to the engine block of the engine 10 via a plurality of bolts. The second case 42 is fastened (connected) to the first case 41 via a plurality of bolts, and configures a case body together with the first case 41. The cover 45 is fastened (connected) to the second case 42 via a plurality of bolts so as to cover one end of the case body in a vehicle width direction, that is, an open end of the second case 42. In this embodiment, the first case 41, the second case 42 and the cover 45 are all cast products formed of, for example, aluminum alloy or steel.

Figure 2:
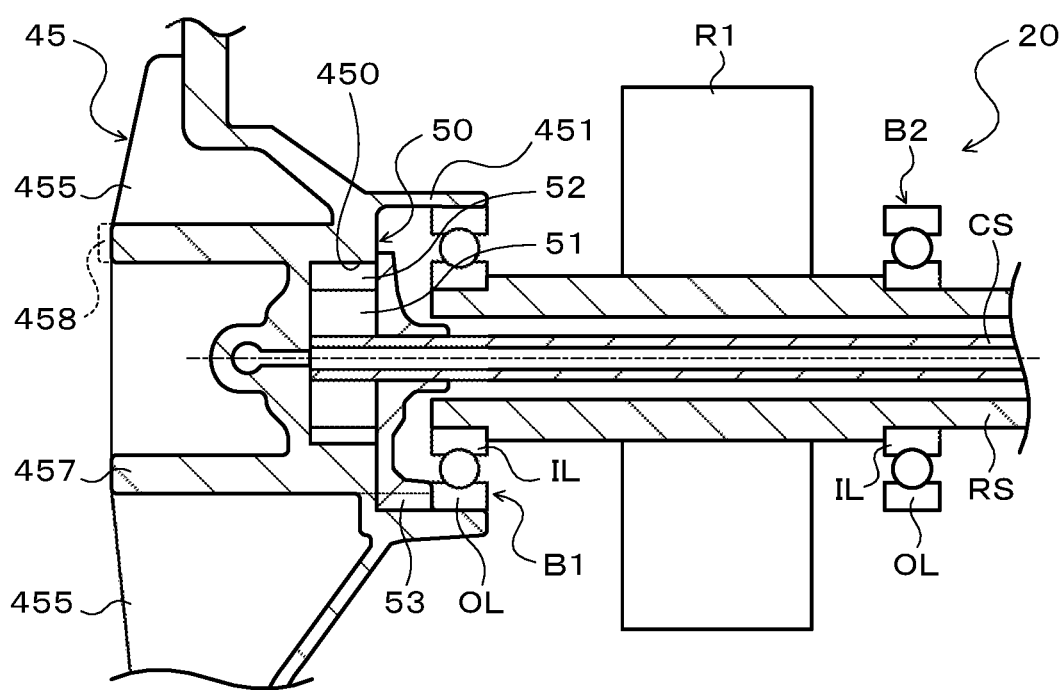
FIG. 2 is an enlarged cross-sectional view of the driving apparatus according to the present disclosure.

In the transaxle 20, the rotor shaft RS of the motor generator MG1 is rotatably supported by the bearings B1 and B2, as shown in FIG. 2. In this embodiment, the bearing B1 is a ball bearing that includes an inner race IL fixed by press fitting to the rotor shaft RS, and an outer race OL fixed by press fitting to a cylindrical portion 451 formed in the cover 45 of the case 40. The bearing B2 is a ball bearing that includes an inner race IL fixed by press fitting to the rotor shaft RS, and an outer race OL fixed by press fitting to a portion (omitted in FIG. 2) of the second case 42 of the case 40.

Further, the transaxle 20 includes a mechanical oil pump 50. As shown in FIG. 2, the oil pump 50 includes an inner rotor 51 and an outer rotor 52 as pump rotors, and a pump cover 53 that defines a pump housing together with a cover 45 of the case 40. The inner rotor 51 is an outer tooth gear (drive gear) with a plurality of outer teeth (not shown), and is connected to the planetary carrier 34 of the planetary gear 30, that is, the crankshaft of the engine 10, via the hollow rotor R1 of the motor generator MG1 and a carrier shaft CS inserted in the rotor shaft RS. The outer rotor 52 is an internal tooth gear (driven gear) with one more number of inner teeth than the total number of outer teeth of the inner rotor 51.

In this embodiment, the inner rotor 51 and outer rotor 52 are disposed in a rotor accommodation chamber 450 formed in the cover 45 of the case 40. The rotor accommodation chamber 450 is a recess of circular cross-sectional shape that is depressed from an inner surface of the cover 45 to an outer surface side. The inner rotor 51 and the outer rotor 52 are rotatably disposed within the rotor accommodation chamber 450 such that one or more inner teeth of the outer rotor 52 mesh with corresponding outer teeth of the inner rotor 51 and the outer rotor 52 is eccentric with respect to the inner rotor 51. The pump cover 53 has a through hole through which the rotor shaft RS is inserted, and is fixed to the cover 45 so as to close the rotor accommodation chamber 450. As a result, when the inner rotor 51 is rotated by power from the carrier shaft CS, that is, the engine 10, hydraulic oil (ATF) in a hydraulic oil reservoir (oil pan, not shown) is sucked by the oil pump 50 through the strainer (not shown), and pressurized hydraulic oil is supplied (discharged) to a hydraulic pressure control devise (not shown).

Figure 3:
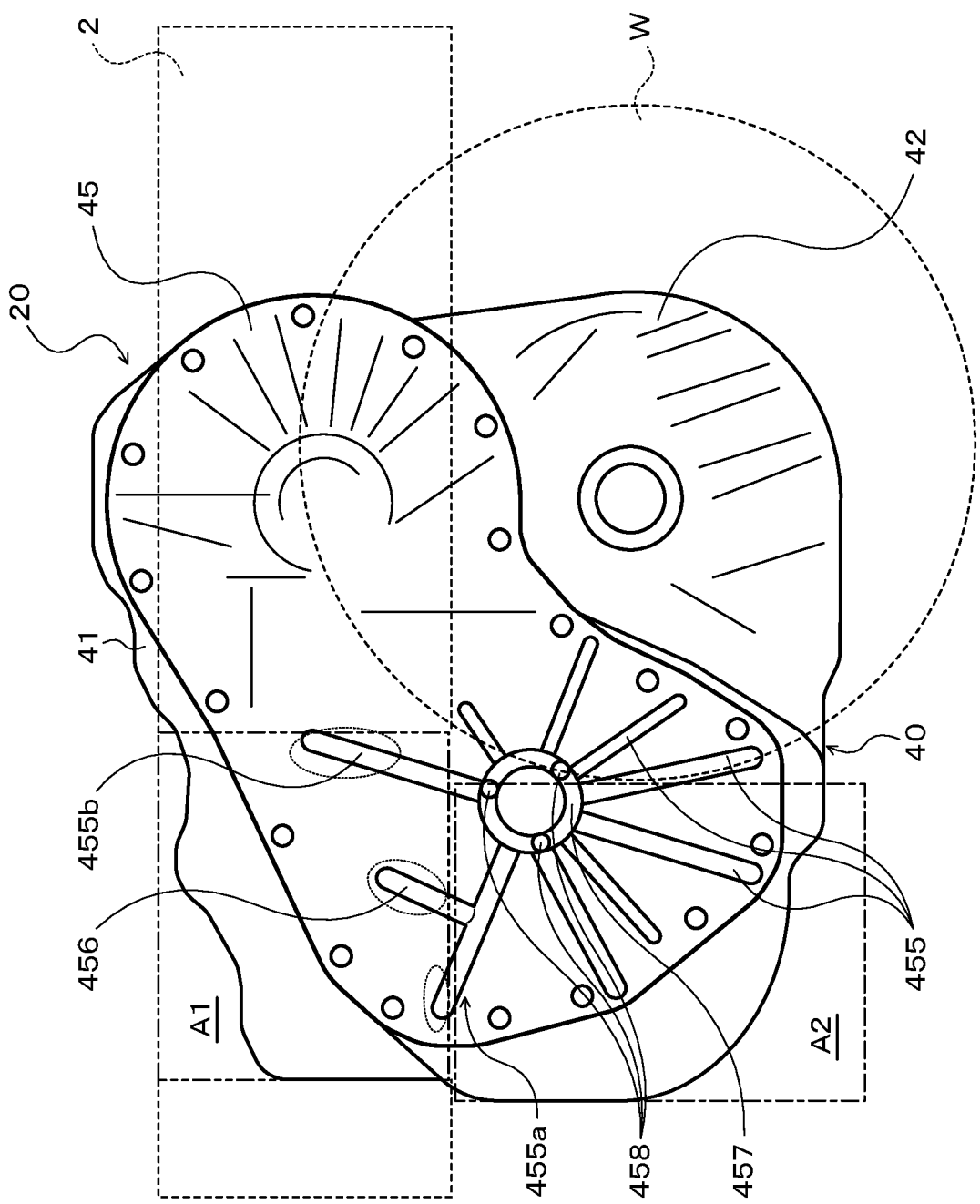
FIG. 3 is a side view illustrating the driving apparatus according to the present disclosure.

FIG. 3 is a side view of the case 40 of the transaxle 20 as viewed from the cover 45 side. As shown in the figure, the transaxle 20 is mounted on the vehicle 1 such that the case 40 partially overlaps a side member 2 of the vehicle 1 and partially overlaps the wheel W connected to the transaxle 20 as viewed from the vehicle width direction (front side of the paper). That is, when the cover 45 is located on a left side of the vehicle 1, for example, the side member 2 is located to the left of the cover 45, and the cover 45 partially overlaps the side member 2 as viewed from the width direction of the vehicle.

As shown in FIG. 3, the case 40 includes a first region A1 that overlaps the side member 2 and does not overlap with the wheel W, and a second region A2 that does not overlap with both the side member 2 and the wheel W, as viewed from the vehicle width direction. In this embodiment, the first and second regions A1, A2 of the case 40 are defined by the cover 45 mainly. In a part of the cover 45 included in the second region A2, a plurality of radial ribs 455 and a connecting rib 457 are formed by casting so as to respectively project in the vehicle width direction and outwardly (on the front side of the paper). On the outer surface of the cover 45, the plurality of radial ribs 455 extend radially, and the connecting rib 457 joins with the center side ends of the plurality of radial ribs 455. In this embodiment, a part of the connecting rib 457 is included outside the second area A2 (the right side area in FIG. 3) as shown in FIG. 3. However, the entirety of the connecting rib 457 may be included in the second region A2.

The plurality of radial ribs 455 respectively extend outwardly from an outer periphery surface of the connecting rib 457 along a predetermined direction. The plurality of radial ribs 455 includes radial ribs 455a and 455b. As shown in FIG. 3, the radial ribs 455a and 455b respectively include a tip portion that reaches the first region A1 beyond the second region A2. Further, in this embodiment, the radial rib 455a includes a branched portion 456 branching off from the main body portion that joins with the connecting rib 457, as shown in FIG. 3. A tip portion of the branched portion 456 also reaches the first region A1 beyond the second region A2.

In this embodiment, as shown in FIGS. 2 and 3, the connecting rib 457 is an annular (cylindrical) projection formed to project coaxially with an axial center (see the single-dot chain line in FIG. 2) of the rotor R1 of the motor generator MG1 and outwardly from the outer surface of the cover 45. In other words, the connecting rib 457 is formed in the cover 45 such that the axial center of the rotor R1 of the motor generator MG1 passes through the inside of the connecting rib 457, and extends annularly around the axial center of the rotor R1 as viewed from the vehicle width direction. In addition, as seen from FIG. 2, the connecting rib 457 encircles the rotor accommodation chamber 450 that accommodates the inner rotor 51 and outer rotor 52 of the oil pump 50 as viewed from the vehicle width direction.

Further, the connecting rib 457 extends coaxially with the cylindrical portion 451 corresponding to the bearing B1, and has an outer diameter slightly smaller than an inner diameter of the cylindrical portion 451. The connecting rib 457 at least partially overlaps the outer race OL of the bearing B1 that is press-fitted into the cylindrical portion 451 as viewed from the vehicle width direction. In addition, a plurality of backup seats 458 (in this embodiment, three) are formed at a free end of the connecting rib 457 at intervals in a circumferential direction. Each of the backup seats 458 is a short protrusion having a flat end surface and projecting in an axial direction of the connecting rib 457. Each backup seat 458 at least partially overlaps the outer race OL of the bearing B1 as viewed from the vehicle width direction.
The end surfaces of the plurality of backup seats 458 are included in a plane orthogonal to the axial center of the rotor R1 of the motor generator MG1.

As described above, in the transaxle 20, the case 40 that accommodates the motor generator MG1 and the like includes a first area A1 that overlaps the side member 2 and does not overlap the wheel W, and a second area A2 that does not overlap both the side member 2 and the wheel W in the vehicle width direction. Also, the covers 45 of the case 40 includes the plurality of radial ribs 455 respectively projecting in the vehicle width direction and outwardly (on the front side of the paper) and extending radially in the second area A2, and at least part of the connecting rib 457 that projects in the vehicle width direction and joins with the center side ends of the plurality of radial ribs 455 in the second area A2. The transaxle 20 favorably secures strength of the second region A2 of the case 40 (cover 45) that does not overlap both the side member 2 and the wheel W.

Further, among the plurality of radial ribs 455, the tips of the radial ribs 455a, 455b and the branched portion 456 of the radial rib 455a reach the first area A1 beyond the second area A2. As a result, when the vehicle 1 is subjected to a collision such as a front collision or a side collision, the side member 2 hits the part included in the radial ribs 455a, 455b connected to the connecting rib 457, and the part included in the branched portion 456 (refer to the portion surrounded by the dotted line in FIG. 3). Accordingly, stress applied from the side member 2 to the radial ribs 455a, 455b and the like can be released to the connecting rib 457 side, or the second area A2, which has high strength.

Thus, when the side member 2 collides with the first region A1 of the case 40 (cover 45), stress in the first region A1 can be reduced so as to suppress an occurrence of damage of the cover 45 and the like in the first region A1. As a result, strength of the case 40 of the transaxle 20, which includes the motor generator MG1 and is mounted on the vehicle 1, can be improved. In addition, an improvement in the strength of the case 40 allows to omit a protective cover that suppresses direct interference between the case 40 and the side member 2 and the like, thereby lowering cost of both the transaxle 20 and the vehicle 1.

In the transaxle 20, the connecting rib 457 is formed in the part of the cover 45 included in the second region A2 so as to extend in an annular manner. The plurality of radial ribs 455 (455a, 455b) respectively extend outward from the outer periphery surface of the connecting rib 457. Thus, since a so-called downgage is formed around (inside) the connecting rib 457, occurrence of blow holes and unconsolidated portions is favorably suppressed when manufacturing the cover 45 including the plurality of radial ribs 455 and the connecting rib 457 by casting. The connecting rib 457 does not necessarily need to be an annular projection as long as it is connected to the center side ends of the plurality of radial ribs 455. In other words, the connecting rib 457 may be a curved projection having both ends and extending in, for example, a circular arc or a C-shape as viewed from the vehicle width direction.

Further, in the transaxle 20, the cover 45 of the case 40 includes the rotor accommodation chamber 450 that accommodates the inner rotor 51 and outer rotor 52 of the oil pump 50. The connecting rib 457 is formed in the cover 45 so as to enclose the rotor accommodation chamber 450 as viewed from the vehicle width direction. As a result, the occurrence of blow holes and unconsolidated portions is favorably suppressed when manufacturing the cover 45 that includes the plurality of radial ribs 455 and the connecting rib 457 by casting and functions as the pump housing of the oil pump 50 by casting.

In addition, in the transaxle 20, the connecting rib 457 includes the plurality of backup seats 458 formed so as to at least partially overlap the outer race OL of the bearing B1 that is press-fitted into the cylindrical portion 451 of the cover 45 as viewed from the vehicle width direction. This enables the outer race OL of the bearing B1 to be easily and smoothly press-fitted into the cylindrical portion 451 of the cover 45 while supporting the back-up seats 458 of the connecting rib 457 by a jig and the like when assembling the bearing B1 to the case 40.

Furthermore, in the transaxle 20, the connecting rib 457 is formed on the cover 45 such that the axial center of the rotor R1 of the motor generator MG1 passes through the inside of the connecting rib 457. This enables the stress (load) transmitted from the radial ribs 455a, 455b to the connecting rib 457 to be received by a high strength support portion of the rotor R1, that is, the cylindrical part 451 that holds the bearings B1, B2, and a high strength part of the second case 42.

In the transaxle 20, as long as at least part of the plurality of radial ribs 455 reaches the first region A1, the connecting rib 457 may be formed other than the second region A2 of the case 40 (cover 45), and may be formed other than the first and second regions A1, A2. Further, in the transaxle 20, the plurality of radial ribs 455 and the connecting rib 457 are formed on the outer surface of the cover 45 of the case 40, but are not limited thereto. That is, for example, when the cover is integrally formed with the second case, the plurality of radial ribs 455 and the connecting rib 457 may be formed on the outer surface of the second case included in the second area A2. It goes without saying that, depending on the strength required of the case 40 (cover 45), the branched portion 456 may be omitted from the radial rib 455a.

Further, the transaxle 20 includes the planetary gear 30 that is accommodated in the case 40 and is connected to the engine 10 of the vehicle 1, the rotor R1 of the motor generator MG1 and the drive shafts DS, and the motor generator MG2 that is accommodated in the case 40 and is connected to the drive shafts DS, but is not limited thereto. That is, the transaxle 20 may be a drive unit for a hybrid electric vehicle that includes a single motor generator or a battery electric vehicle. In addition, in the transaxle 20, the oil pump 50 may include the inner rotor 51 and the outer rotor 52 that are accommodated other than the rotor accommodation chamber (recess) 450 of the cover 45. Furthermore, the oil pump 50 of the transaxle 20 is not limited to the gear pump, but may be a vane pump including a pump rotor disposed in the above rotor accommodation chamber 450 and the like.

As has been described above, the driving apparatus (20) of the present disclosure includes the electric motor (MG1) including the stator (S1) and a rotor (R1), the case (40, 45) accommodating the electric motor (MG1), and the drive shaft (DS) connected the wheel (W). The case (40, 45) is mounted on the vehicle (1) so as to partially overlap the side member (2) as viewed from the vehicle width direction. The driving apparatus (20) further includes the plurality of radial ribs (455, 455a, 455b) respectively projecting in the vehicle width direction and extending radially, and the connecting rib (457) projecting in the vehicle width direction and joining with center side ends of the plurality of radial ribs (455, 455a, 455b). At least part of the plurality of radial ribs (455, 455a, 455b) reach a first region (A1) of the case (40, 45) that overlaps the side member (2) and does not overlap the wheel (W) as viewed from the vehicle width direction.

When the vehicle including the driving apparatus of the present disclosure is subjected to a collision, such as a front collision or a side collision, the side member hits the portion included in the first region of the radial ribs connected to the connecting rib. Thus, when the side member collides with the first region of the case, stress applied from the side member to the radial ribs can be released to the connecting ribs having high strength, and the stress in the first region can be reduced so as to suppress the occurrence of damage in the first region. As a result, strength of the case of the driving apparatus, which includes the electric motor and is mounted on the vehicle, can be improved. In addition, an improvement in the strength of the case allows to omit a protective cover that suppresses direct interference between the case and the side member and the like, thereby lowering cost of both the driving apparatus and the vehicle. The radial rib may include a branched portion that branches off from the radial rib and reaches the first region beyond the second region.

The connecting rib (457) may be formed in the region other than the first region (A1) of the case (40, 45) so as to extend annularly. The plurality of radial ribs (455, 455a, 455b) may respectively extend outward from the outer peripheral surface of the connecting rib (457). Thus, occurrence of damage and the like in the first area is satisfactorily suppressed when the side member collides with the first area of the case. Furthermore, since a so-called downgage is formed around the connecting ribs, occurrence of blow holes and unconsolidated portions is favorably suppressed when the case including the plurality of radial ribs and connecting rib are manufactured by casting.

The case (40, 45) may further include the second region (A2) that does not overlap with both the side member (2) and the wheel (W) as viewed from the vehicle width direction. At least a portion of the connecting rib (457) may be included in the second region (A2) of the case (40, 45). At least part of the plurality of radial ribs (455, 455a, 455b) may reach beyond the second region (A2) into the first region (A1). This driving apparatus favorably ensures strength of the second region of the case that does not overlap with both the side member and the wheel. Further, when the side member collides with the first region of the case, stress applied from the side member to the radial ribs can be released to the connecting rib or the second region. As a result, the strength of the case of the driving apparatus including the electric motor and mounted on the vehicle can be further improved.

The connecting rib (457) may be formed in the second region (A2) of the case (40, 45) such that the axial center of the rotor (R1) passes through the inside of the connecting rib (457). This enables the stress (load) transmitted to the connecting rib to be received by a high strength supporting portion of the rotor of the electric motor which is increased strength.

The driving apparatus (20) may further include: the bearing (B1) that includes the outer race (OL) press-fitted into the case (40) and rotatably supports the rotor (R1) of the electric motor (MG1). The connecting rib (457) may include the backup seat (458) formed so as to at least partially overlap the outer race (OL) of the bearing (B1) as viewed from the vehicle width direction. This enables the outer race of the bearing to be easily and smoothly press-fitted into the case while supporting the back-up seat of the connecting rib with a jig and the like when assembling the bearing to the case.

The case (40) may include the case body (41, 42) that accommodates the electric motor (MG1), and the cover (45) that covers one end of the case body (41, 42) in the vehicle width direction. The plurality of radial ribs (455) and the connecting rib (457) may be formed on an outer surface of the cover (45).

The driving apparatus (20) may include the oil pump (50) including at least one pump rotor (51, 52). The cover (45) may include the recess (450) that accommodates the pump rotor (51, 52) of the oil pump (50). The connecting rib (457) may be formed in the cover (45) so as to at least partially surround the recess (450) as viewed from the vehicle width direction. As a result, when the cover, that includes the plurality of radial ribs and the connecting rib and also functions as the housing of the oil pump, is manufactured by casting, occurrence of blow holes and unconsolidated portions can be favorably suppressed.

The driving apparatus (20) may further include: the planetary gear (30) accommodated in the case (40) and connected to the internal combustion engine (10) of the vehicle (1), the rotor (R1) of the electric motor (MG1), and the drive shaft (DS), and the second electric motor (MG2) accommodated in the case (40) and connected to the drive shaft (DS). The rotor (R1) of the electric motor (MG1) may be formed to be hollow. The pump rotor (51) of the oil pump (50) is connected to the internal combustion engine (10) via the shaft (CS) inserted into the rotor (R1) of the electric motor (MG1) and the rotating element (34) of the planetary gear (30).

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the driving apparatus mounted on the vehicle.

The invention claimed is:

1. A driving apparatus that includes an electric motor including a stator and a rotor, a case accommodating the electric motor, and a drive shaft connected to a wheel, the case to be mounted on a vehicle so as to partially overlap a side member as viewed from a vehicle width direction, the driving apparatus comprising:
   a plurality of radial ribs respectively projecting in the vehicle width direction and extending radially, at least part of the plurality of radial ribs reaching a first region of the case that overlaps the side member and does not overlap with the wheel as viewed from the vehicle width direction, and
   a connecting rib projecting in the vehicle width direction and joining with center side ends of the plurality of radial ribs.

2. The driving apparatus according to claim 1,
   wherein the connecting rib is formed in a region other than the first region of the case so as to extend annularly, and
   wherein the plurality of radial ribs respectively extend outward from an outer peripheral surface of the connecting rib.

3. The driving apparatus according to claim 1,
   wherein the case further includes a second region that does not overlap with both the side member and the wheel as viewed from the vehicle width direction,
   wherein at least a portion of the connecting rib is included in the second region of the case, and
   wherein at least part of the plurality of radial ribs reach beyond the second region into the first region.

4. The driving apparatus according to claim 3,
   wherein the connecting rib is formed in the second region of the case such that an axial center of the rotor passes through the inside of the connecting rib.

5. The driving apparatus according to claim 1, further comprising:
   a bearing that includes an outer race press-fitted into the case and rotatably supports the rotor of an electric motor,
   wherein the connecting rib includes a backup seat formed so as to at least partially overlap the outer race of the bearing as viewed from the vehicle width direction.

6. The driving apparatus according to claim 1,
   wherein the case includes a case body that accommodates the electric motor, and a cover that covers one end of the case body in the vehicle width direction, and
   wherein the plurality of radial ribs and the connecting rib are formed on an outer surface of the cover.

7. The driving apparatus according to claim 6, further comprising:
   an oil pump including at least one pump rotor,
   wherein the cover includes a recess that accommodates the pump rotor of the oil pump, and
   wherein the connecting rib is formed in the cover so as to at least partially surround the recess as viewed from the vehicle width direction.

8. The driving apparatus according to claim 7, further comprising:
   a planetary gear accommodated in the case and connected to an internal combustion engine of the vehicle, the rotor of the electric motor, and the drive shaft, and
   a second electric motor accommodated in the case and connected to the drive shaft,
   wherein the rotor of the electric motor is formed to be hollow, and
   wherein a pump rotor of the oil pump is connected to the internal combustion engine via a shaft inserted into the rotor of the electric motor and a rotating element of the planetary gear.

* * * * *